United States Patent
Kim

(10) Patent No.: US 9,601,112 B2
(45) Date of Patent: Mar. 21, 2017

(54) SPEECH RECOGNITION SYSTEM AND METHOD USING INCREMENTAL DEVICE-BASED ACOUSTIC MODEL ADAPTATION

(71) Applicant: ELECTRONICS AND TELECOMMUNICATIONS RESEARCH INSTITUTE, Daejeon (KR)

(72) Inventor: Dong-Hyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 126 days.

(21) Appl. No.: 14/256,386

(22) Filed: Apr. 18, 2014

(65) Prior Publication Data

US 2015/0081300 A1    Mar. 19, 2015

(30) Foreign Application Priority Data

Sep. 17, 2013 (KR) ........................ 10-2013-0111918

(51) Int. Cl.
*G10L 15/07* (2013.01)
*G10L 15/22* (2006.01)

(52) U.S. Cl.
CPC ........ *G10L 15/07* (2013.01); *G10L 2015/228* (2013.01)

(58) Field of Classification Search
CPC .................................................... G10L 15/07
See application file for complete search history.

(56) References Cited

U.S. PATENT DOCUMENTS

2010/0195806 A1* 8/2010 Zhang .............. H04M 3/42153
 379/88.01
2013/0311184 A1* 11/2013 Badavne et al. .............. 704/250

FOREIGN PATENT DOCUMENTS

KR    10-2007-0060581    6/2007
KR    10-2011-0010233    2/2011

OTHER PUBLICATIONS

"Unsupervised Discovery and Training of Maximally Dissimilar Cluster Models", Françoise Beaufays et al., Google, Sep. 2010, Makuhari, Chiba, Japan, pp. 66-69.

* cited by examiner

*Primary Examiner* — Mohammad Ghayour
*Assistant Examiner* — Lennin Rodriguezgonzalez
(74) *Attorney, Agent, or Firm* — Staas & Halsey LLP

(57) ABSTRACT

An embodiment of the present invention relates to a speech recognition system and method using incremental device-based acoustic model adaptation. The speech recognition system comprises a model selection module selecting an acoustic model of multi-model tree by verifying and categorizing a device key transmitted from a user device; a model management module generating and incrementally adapting multi-model tree by categorizing voice data based on a user device; and a speech recognition module performing speech recognition by receiving the acoustic model selected from the model selection module and transmitting data of which reliability exceeds a predetermined threshold value to the model management module.

16 Claims, 4 Drawing Sheets

SPEECH RECOGNITION SYSTEM AND METHOD USING INCREMENTAL DEVICE-BASED ACOUSTIC MODEL ADAPTATION

CROSS-REFERENCE TO RELATED APPLICATIONS

This application claims the benefit of Korean Patent Application No. 10-2013-0111918, filed with the Korean Intellectual Property Office on Sep. 17, 2013, the disclosure of which is incorporated herein by reference in its entirety.

TECHNICAL FIELD

An embodiment of the present invention relates to a speech recognition system and method using incremental device-based acoustic model adaptation and more particularly, to a speech recognition system of which speech recognition performance is gradually improved with continuous uses of speech recognition services from the same user device without any involvement of a user since an identification device key is automatically generated for the user device.

DESCRIPTIONS OF RELATED ARTS

There has been a large expectation for user dependent performances as a speech recognition system is used in a variety of personal device. A lot of speaker's voice data are needed to make a user dependent acoustic model and a lot of time for collecting such data are also needed. Thus, speaker adaptation methods requiring a small amount of voice data have been proposed.

However, since the more data the more improved performance is expected for such speaker adaptation methods, there is a pressure to increment data continuously. Furthermore, in case of an online speech recognition service, it is inconvenient because speaker recognition and authentication has to be performed in order to save data after categorizing individual speakers.

SUMMARY

Accordingly, in order to resolve the problems associated with the conventional technologies, an embodiment of the present invention to provide a speech recognition system and method using incremental device-based acoustic model adaptation of which speech recognition performance can be gradually improved with continuous uses of speech recognition services from the same user device without any involvement of a user by automatically generating an identification device key for the user device.

A speech recognition system using incremental device-based acoustic model adaptation according to an embodiment of the present invention to achieve the above-mentioned object comprises: a model selection module selecting an acoustic model of a multi-model tree by verifying and categorizing a device key transmitted from a user device; a model management module generating and incrementally adapting a multi-model tree by categorizing voice data based on a user device; and a speech recognition module performing speech recognition based on the acoustic model received from the model selection module and transmitting data of which reliability exceeds a predetermined threshold value to the model management module.

The model selection module comprises a device key verification part verifying a device key if it is a new device key or an existing device key, registering the device key to a device key tree which is a component of the multi-model tree when the device key is a new device key, and receiving an available acoustic model list of the device key tree from the multi-model tree when the device key is an existing device key; and a model selecting part selecting one acoustic model or multi acoustic models to be used for parallel recognition from the acoustic model list and transmitting address and the device key information of the selected model to the speech recognition module.

Here, the acoustic model list may comprise sequentially a device independent model, a device dependent model, a detail device dependent model and a random ID dependent model included in the multi-model tree.

In addition, the model selecting part may search and select acoustic models from a device node of an acoustic model tree which is a component of the multi-model tree using the device key, and select acoustic models from an upper node connected to the device node if no acoustic model does is present in the device node.

The model selecting part may select multi acoustic models from acoustic models of the user device corresponding to the device key and acoustic models of the upper node according to a predetermined rule in case of performing parallel recognition.

The model management module may comprise a device-based multi-model tree generating part categorizing the voice data based on a user device, extracting features therefrom and forming a multi-model tree; a multi-model tree categorized by a user device and comprising hierarchical acoustic models, incremental data and device key trees; a data incrementing part receiving data of which the reliability exceeds a predetermined threshold value from the speech recognition module, incrementing phonetic information and data to the multi-model tree, evaluating degree of the incremented data of each node and reporting the result to a model adaptation generating part when it exceeds a predetermined reference value; and the model adaptation generating part incrementally adapting acoustic models corresponding to nodes, where newly adapted data from the multi-model tree exceeds the predetermined reference value, by using the information transmitted from the data incrementing part.

The device-based multi-model tree generating part may categorize the voice data by a user device and generate a multi-model tree which generates a device dependent model adapted at a device independent model.

The multi-model tree may register the device key to the device key tree and generate a data node to collect data when a new device key is transferred from the model selection module.

The data incrementing part may search the node registered in the multi-model tree by using the device key received from the speech recognition module and increment data to the searched node and its upper node.

The speech recognition module may comprise a pre-processing part pre-processing speech signals inputted from the user device; a recognition part performing speech recognition using feature-extracted data provided from the pre-processing part and the acoustic model selected by the model selection module; and a reliability determining part determining reliability of the speech recognition result received from the recognition part, outputting result with the highest reliability as a recognition result, and transmitting phonetic information, data and device key to the model management module when the reliability exceeds the threshold value.

The recognition part may receive a plurality of acoustic models from the model selection module and perform parallel speech recognition for the plurality of acoustic models.

A speech recognition program is installed in a user device and comprises: a device key transferring part generating a device key with the initial installation of a speech recognition program and transmitting the device key to the model selection module, and transmitting the device key to the model selection module whenever the speech recognition program is used; and a speech recording part recording voice data inputted when speech recognition is performed and transmitting the recorded voice data or the feature-extracted data to the speech recognition module.

The device key may comprise a device name, a device detail name and a random ID.

The multi-model tree may comprise a data tree in which the entire data is categorized based on device; an acoustic model tree in which an acoustic model of each node is generated by using the data in a node of the data tree as an adaption data; and a device key tree in which a device key is registered.

A speech recognition method using incremental device-based acoustic model adaptation according to another embodiment of the present invention to achieve the above-mentioned object may comprise registering a device key transferred from a user device when a speech recognition program is installed to a device key tree; selecting an available acoustic model by using the device key when the device key is transferred from the user device with execution of the speech recognition program; performing speech recognition using the available acoustic model and the voice data transferred from the user device; incrementing data, of which reliability exceeds a threshold value when the reliability of the speech recognition result is determined, with recognition information to a device node and an immediate upper node of multi-model tree according to the device key; and performing acoustic model incremental adaptation when data of each node of the multi-model tree exceeds a predetermined reference value.

According to an embodiment of the present invention, the speech recognition system using incremental device-based acoustic model adaptation can use an acoustic model close to a user's voice rather than an independent acoustic model by orienting a user-dependent acoustic model incremented with user's data, instead of the independent acoustic model which considers all user's environments, and generating a multileveled tree type acoustic model for the case when sufficient user's models are not collected.

In addition, it can generate an acoustic model with reduced channel noises by cooperating with other users' incremental data having common channel features and generate a speaker dependent acoustic model using user's data by a continuous incremental adaptation processor.

It can also perform automatic registration and authentication of a user by utilizing a device key without performing issuing ID, registration and authentication of a user.

It can be used quickly by selecting a single model or a plurality of models according to a user device without performing additional recognition processes.

DETAILED DESCRIPTION

Hereinafter, certain embodiments of the invention will be described below in more detail with reference to the accompanying drawings, in which those components are rendered the same reference number that are the same or are in correspondence, regardless of the figure number, and redundant explanations are omitted. Throughout the description of an embodiment of the present invention, when describing a certain technology is determined to evade the point of an embodiment of the present invention, the pertinent detailed description will be omitted.

Figure 1:
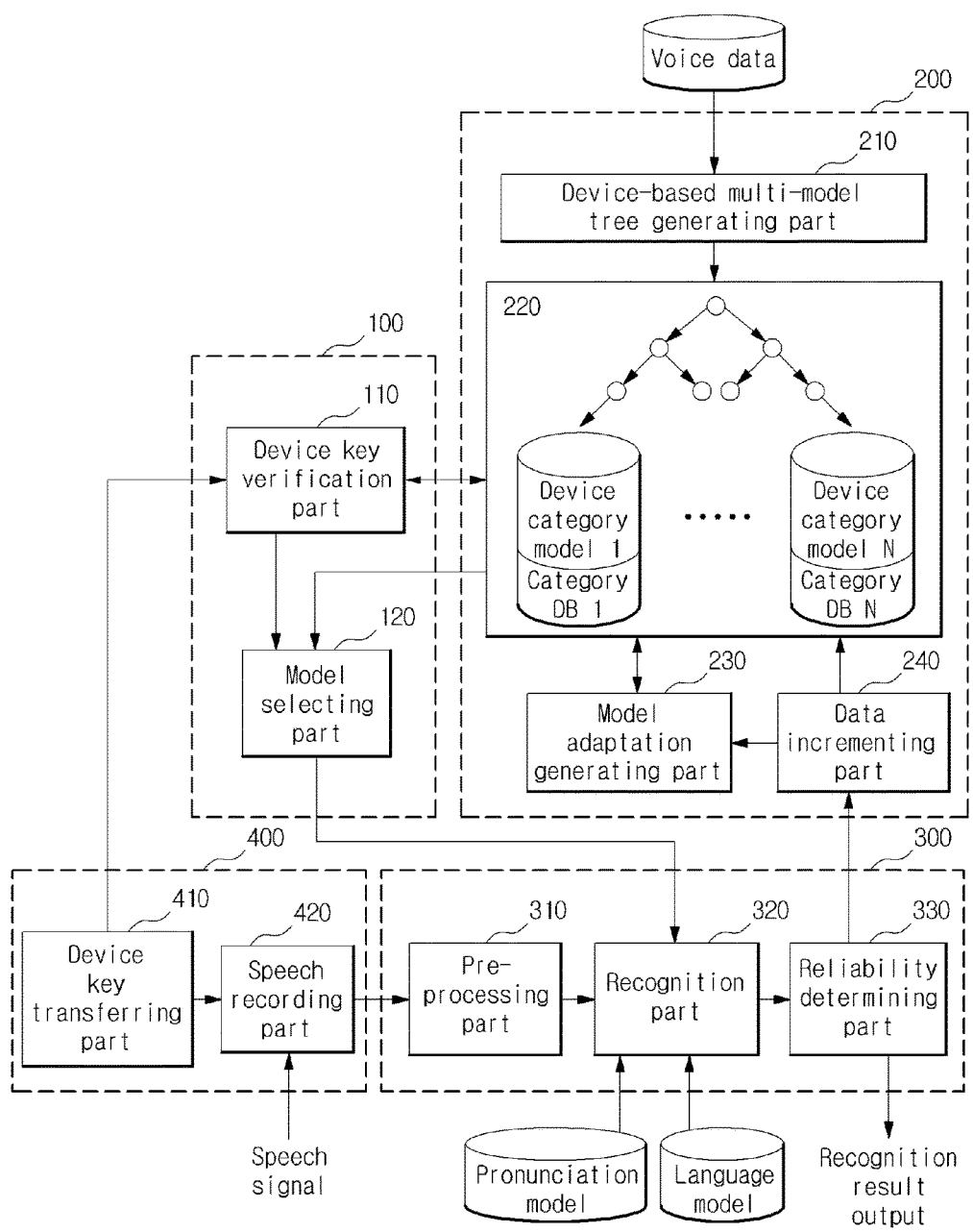
FIG. 1 is a structure chart illustrating a speech recognition system using incremental device-based acoustic model adaptation according to an embodiment of the present invention.

FIG. 1 is a structure chart illustrating a speech recognition system using incremental device-based acoustic model adaptation according to an embodiment of the present invention.

Referring to FIG. 1, a speech recognition system using incremental device-based acoustic model adaptation according to an embodiment of the present invention can comprise a speech recognition server comprising a model selection module 100, a model management module 200 and a speech recognition module 300 and a user device in which a speech recognition program 400 is installed.

The model selection module 100 can comprise a device key verification part 110 and a model selecting part 120 to select an acoustic model of a multi-model tree by verifying and categorizing a device key.

The device key verification part 110 verifies if a device key transmitted from a user device is a new device key or an existing device key, and then registers it to a device key tree which is a component of the multi-model tree when it is a new device key or receives an available acoustic model list of the device key tree from the multi-model tree when it is an existing device key.

As described below with reference to FIG. 4, the acoustic model list can include sequentially a device independent model (221 of FIG. 4), a device dependent model (222 of FIG. 4), a detail device dependent model (223 of FIG. 4) and a random ID dependent model (224 of FIG. 4) which are included in the multi-model tree 220.

The model selecting part 120 selects multi-models or a single model to be used for final parallel recognition depending on a selection option from the available acoustic model list transmitted from the device key verification part 110. The model selecting part 120 also transmits address and device key information of the selected model from the multi-model tree 220 to a recognition part 320 of the speech recognition module 300.

The model management module 200, which categorizes voice data by a user device, generates and incrementally adapts a multi-model tree, can comprise a device-based multi-model tree generating part 210, a multi-model tree 220, a model adaptation generating part 230 and a data incrementing part 240.

The device-based multi-model tree generating part 210 forms a multi-model tree by categorizing voice data based on a user device and extracting features therefrom. More particularly, the device-based multi-model tree generating part 210 categorizes voice data based on a user device and generates a device dependent model by adapting each data to a device independent model to form a multi-model tree.

The multi-model tree 220 is a multi-model tree categorized by a user device and includes hierarchical acoustic models, incremental data and device key trees.

When a new device key is transferred from the device key verification part 110 for registration, the multi-model tree 220 registers it to a device key tree and generates a data node to collect data.

The model adaptation generating part 230 incrementally adapts an acoustic model which corresponds to a node in which newly incremented data from the multi-model tree 220 is stacked over a reference time, by using information transferred from the data incrementing part 240. This is an adaptation method utilizing the data collected from an existing model as adaptation data such as MAP (Maximum a Posteriori), MLLR (Maximum Likelihood Linear Regression), and MAPLR (Maximum a Posteriori Linear Regression) acoustic model adaptation methods.

The data incrementing part 240 receives data, of which reliability exceeds a threshold value, from the reliability determining part 330 of the speech recognition module 300 and adapts the phonetic information and data to the multi-model tree 220. More particularly, the data incrementing part 240 searches a registered node from the multi-model tree 220 by using a device key transmitted from the reliability determining part 330 of the speech recognition module 300 and adapts the searched node and its upper node. The data incrementing part 240 evaluates degree of the increment of newly inputted data saved in each node based on a predetermined reference value (i.e., data time reference value) and reports the result to a model adaptation generating part 230 when it exceeds a predetermined reference value.

The speech recognition module 300 receives the acoustic model which is the most appropriate to a user device from the model selection module 100, performs speech recognition, and transmits data, of which reliability is highly recognized, to the model management module 200. The speech recognition module 300 comprises a pre-processing part 310, a recognition part 320 and a reliability determining part 330.

The pre-processing part 310 pre-processes speech signals inputted from the user device to provide to the recognition part 320. When voice data is received from the user device, the pre-processing part 310 performs feature extraction, cepstral mean normalization (CMN) and endpoint detection, noise reduction and the like. On the other hand, when feature-extracted data is received from the user device, the pre-processing part 310 performs the pre-processing except feature extraction.

The recognition part 320 performs speech recognition using the feature-extracted data provided from the pre-processing part 310 and the acoustic model selected by the model selecting part 120. Here, the recognition part 320 can receive a plurality of acoustic models from the model selecting part 120 and perform parallel speech recognition for the plurality of acoustic models. The recognition part 320 transmits the speech recognition result to the reliability determining part 330.

The reliability determining part 330 determines the reliability of the speech recognition result provided from the recognition part 320 and outputs the result with the highest reliability as a recognition result. When the reliability exceeds a threshold value, the reliability determining part 330 transmits corresponding phonetic information and data and the device key received from the recognition part 320 to the data incrementing part 240 of the model management module 200.

The speech recognition program 400 is a speech recognition program installed in the user device and can comprise a device key transferring part 410 and a speech recording part 420.

The device key transferring part 410 generates a device key when the speech recognition program 400 is initially installed and transmits it to the device key verification part 110 of the model selection module 100. The device key transferring part 410 also transmits a device key to the device key verification part 110 of the model selection module 100 in order to use a model which is appropriate to the user device for speech recognition whenever the speech recognition program is executed.

The speech recording part 420 records inputted voice data and transmits the result to the pre-processing part 310 of the speech recognition module 300 when speech recognition is performed by executing the speech recognition program 400. Here, the speech recording part 420 can also transmit feature-extracted data, instead of voice data, after feature extracting from the voice data, to the pre-processing part 310 of the speech recognition module 300.

Figure 2:
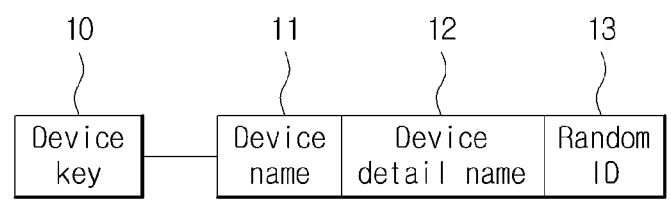
FIG. 2 is a block diagram illustrating a device key used for a speech recognition system using incremental device-based acoustic model adaptation according to an embodiment of the present invention.

FIG. 2 is a block diagram illustrating a device key used for a speech recognition system using incremental device-based acoustic model adaptation according to an embodiment of the present invention.

Referring to FIG. 2, a device key 10 can be generated using identity information registered in the user device and be used without the user's consent.

The device key 10 is generated automatically to be provided as registration information to a speech recognition server when the speech recognition program is installed to the user device. Thus, a new key is registered in the multi-model tree to select an acoustic model group which is appropriate thereto. Then, when the speech recognition program is used, the device key 10 is used for speech recognition server authentications and to use pre-selected acoustic model for speech recognitions. The device key 10 can comprise a device name 11, a device detail name 12 and a random ID 13.

The device name 11 means a general device name, for example, a product name. The device name 11 can be a device company name or a name of product groups and it is thus likely to use microphones and multi-sensors with similar channel characteristics.

The device name 11 of the device key 10 can be used to categorize voice data and form a multi-model tree.

The device detail name 12 means a detail name of a particular device, for example, a version of a product. Microphones and multi-sensors with different channels can be used for each detail device. Voice data can be categorized based on the device detail name 12 to form a multi-model tree.

The random ID 13 means an ID generated randomly to correspond to a device-specific identification number (serial number). The random ID 13 can be a sole value and used as a registration key when the device name 11 and the device detail name 12 are identical. Voice data can be categorized to form a multi-model tree by a device key using the random ID 13 to improve speech recognition performance in the same device.

Figure 3:
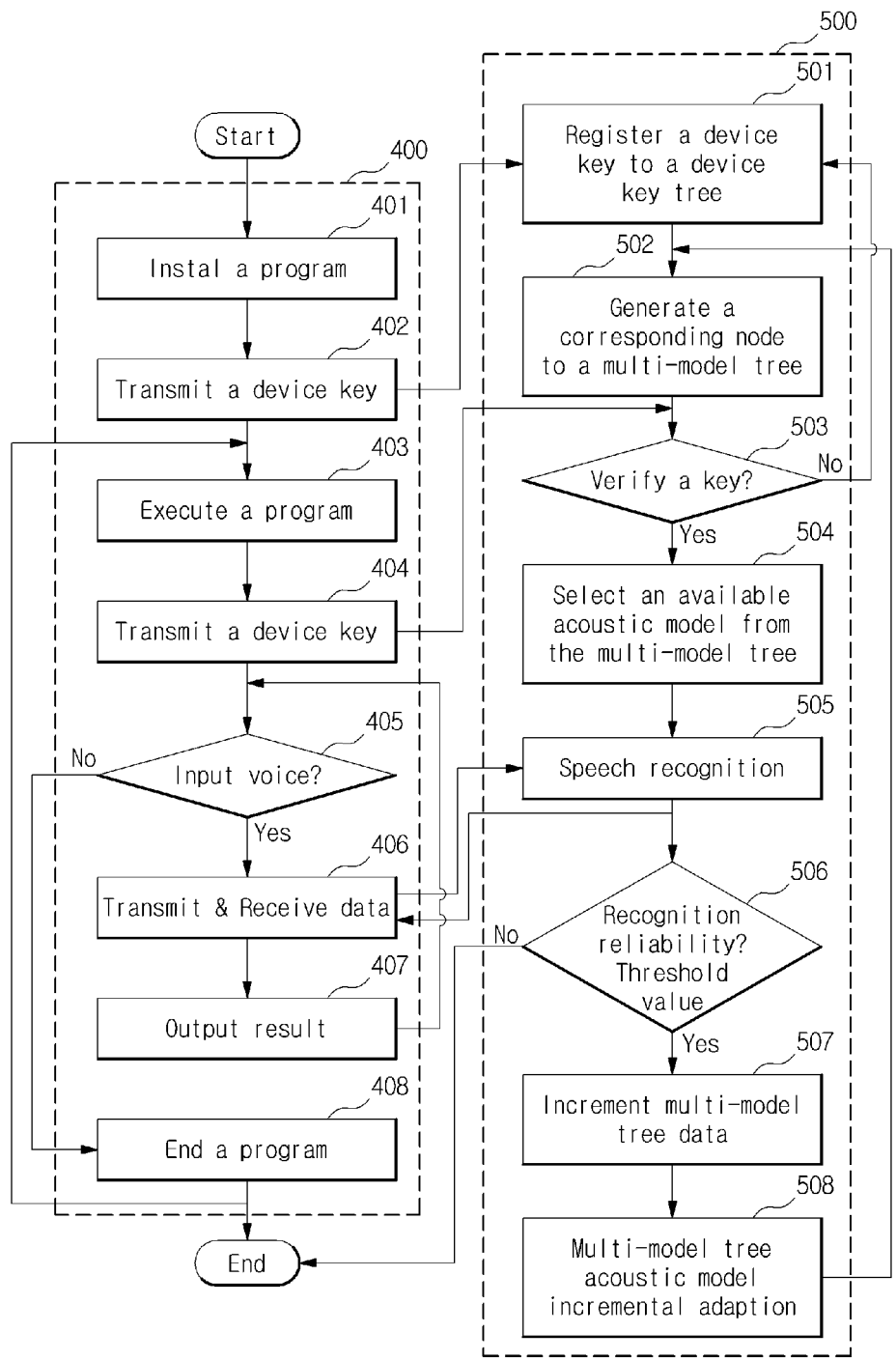
FIG. 3 is a flowchart illustrating a speech recognition method using incremental device-based acoustic model adaptation according to an embodiment of the present invention.

FIG. 3 is a flowchart illustrating a speech recognition method using incremental device-based acoustic model adaptation according to an embodiment of the present invention.

An operation of a user device in which a speech recognition program is installed will be described first.

A speech recognition program is installed in a user device to which voice input is available (401) and a device key is generated with the initial installation of the speech recognition program and then transmitted to a speech recognition server (402).

When the speech recognition program is executed for speech recognition (403), the device key is transmitted to a speech recognition server whenever the program is executed (404).

When voice input is determined (405), voice data is transmitted to the speech recognition server and speech-recognized character string is received (406) and the result is output (407). Feature-extraction of the voice data can be performed at the user device or at the speech recognition server. When voice input is not determined, the speech recognition program is ended (408). When the speech recognition program is re-executed, the process returns to Step 403.

As described with reference to FIG. 1, an operation of the speech recognition server including a model selection module, a model management module and a speech recognition module will be described.

When a device key is transmitted with the installation of a speech recognition program from a user device, the device key is then registered to a device key tree (501) and a node corresponding to the registered device key is generated to the multi-model tree (502) to store data and prepare acoustic model structure. Here, the acoustic model corresponding to the very first registered device key can be a device key category to become an upper (parent) model of the generated node.

When a device key is transmitted with the execution of the speech recognition program from the user device, the device key is verified (503), it returns to Step 501 if the device key is not registered, while an available acoustic model list is selected and an address value is received from the multi-model tree if the device key is registered (504).

Speech recognition is performed using the available acoustic model and the voice data transmitted from the user device (505).

After determining the reliability of the speech recognition result which can be a number of results, the data of which the reliability exceeds a threshold value is selected (506). The selected data is incremented with recognition information to the device node of the multi-model tree and the immediate upper node according to the corresponding device key (507).

When data in each node of the multi-model tree is collected more than a predetermined reference value, acoustic model incremental adaptation is performed (508).

Figure 4:
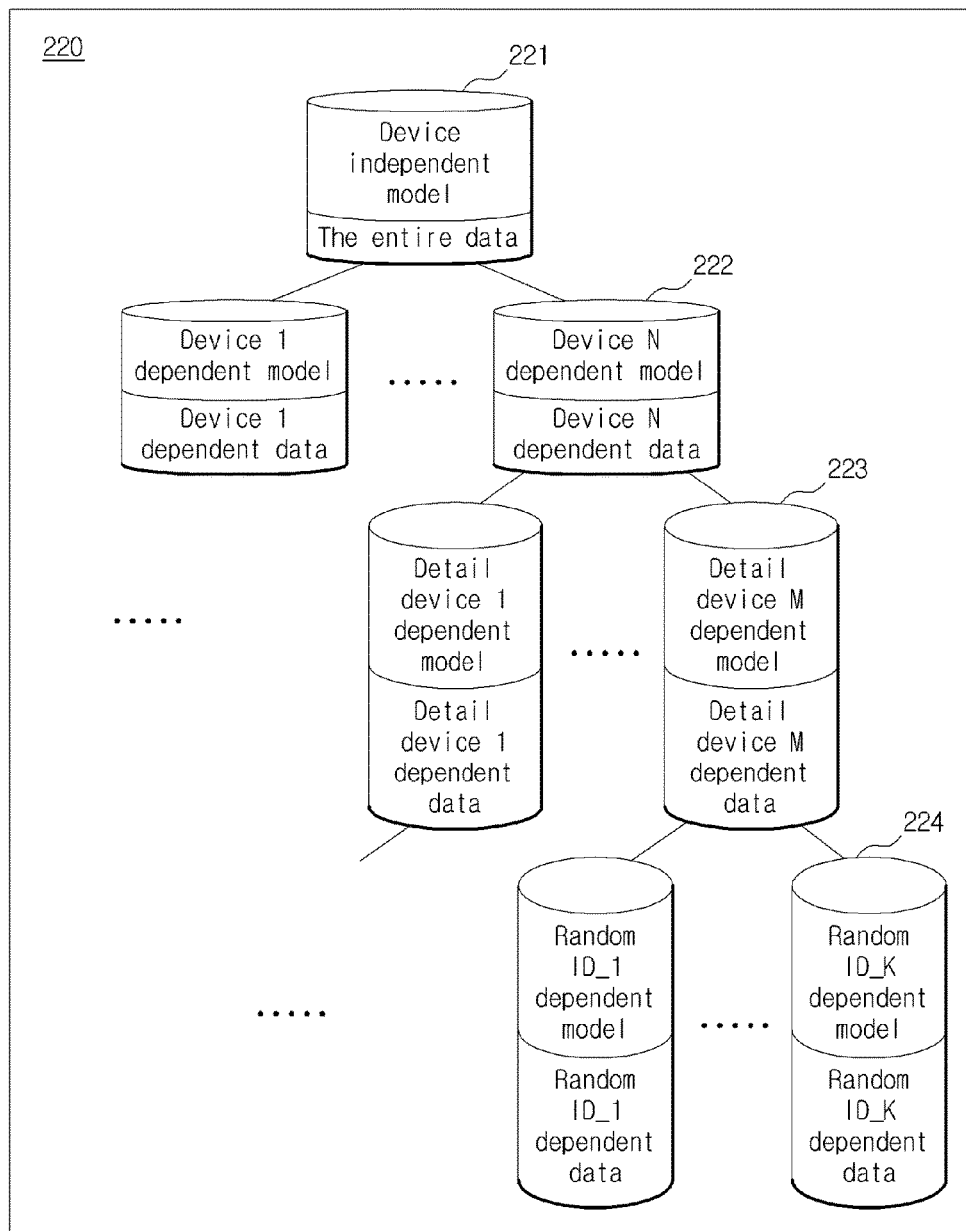
FIG. 4 is a block diagram illustrating acoustic models and incremental data of device-based multi-model tree according to an embodiment of the present invention.

FIG. 4 is a block diagram illustrating acoustic models and incremental data of device-based multi-model tree according to an embodiment of the present invention.

The multi-model tree according to an embodiment of the present invention can be structured by the following three trees: a data tree in which the entire data is categorized based on a device; an acoustic model tree in which an acoustic model of each node is generated by utilizing the data in the node of the data tree as adaptation data; and a device key tree in which a device key is registered to select an acoustic model.

A device independent model 221 is an acoustic model, which can be used generally for speech recognition services, and can be used together as a reference (comparison) model in speech recognitions, particularly parallel recognitions. The device independent model 221 has existing learning acoustic data.

The device dependent model 222 is generated by categorizing device dependent data from the existing learning data and performing acoustic model adaptation to the device independent model 221 by utilizing the categorized device dependent data as adaptation data.

The detail device dependent model 223 is generated by categorizing device dependent data from the existing learning data in more detail and performing acoustic model adaptation to the device dependent model 222 by utilizing the categorized device dependent data in more detail as adaptation data.

The random ID dependent model 224 is generated by the following processes. A node is generated using a device key transmitted when a speech recognition program is installed in each user device and the data having the highest reliability from the data speech-recognized at the user device is incrementally stored. Here, the data is incremented at the immediate upper nodes. When the incremented data exceeds a predetermined reference value, the random ID dependent model 224 is generated by performing incremental adaptation to the device dependent model 222 or detail device dependent model 223 which are immediate upper nodes.

Device key formation and authentication method, device dependent acoustic model tree generation method, acoustic model tree incremental update method and speech recognition model selection in the speech recognition system using incremental device-based acoustic model adaptation will be described in more detail with reference to FIG. 1 to FIG. 4.

Device Key Formation and Authentication Method

A user device can utilize device-relating information for a device key formation as shown in FIG. 2. For example, in case of a smartphone, it provides device name information and device detail name information to a speech recognition server when an App program for speech recognition is installed.

The device name can be important information since it differentiates channel features of the user device. For example, in cases of that the user device is a tablet and a smartphone, respectively, each default microphone's characteristic is different each other so that the acoustic model optimal to the recorded speech data is different. Further, in case of that the user device is a smartphone, recording characteristics of voice data can vary with manufacturing companies.

The device detail name is information of detail classifications or versions of the user device and can be thus used when channel features are explicitly changed with release of new version.

The random ID is a number generated to distinguish individual users by assigning random numbers. Such random numbers are generated not to find any linkage with individual users when a speech recognition program is installed since collecting MAC addresses or smartphone numbers corresponding to personal information is prevented for personal information protections.

A device key described above is used in an embodiment of the present invention in order to eliminate inconvenience of initially registering a speaker and processing the speaker authentication whenever used which have been performed in a conventional method such as performing proper speech recognition using registration information of a speaker.

In other words, a device key, automatically generated when a speech recognition program is installed in a user device, can be automatically registered in a speech recognition server and then used for automatic authentication when the speech recognition program is executed so that inconvenience can be eliminated.

Particularly, the device key can be registered in a device node as a random ID through the device name node which is the upper node and device detail name node in the device key screening which is categorized in a tree form. And an appropriate acoustic model can be selected after authentication through the device key tree screening when the program is executed.

When the device key is registered and the device key tree is generated, the acoustic model tree and the incremental data tree are also generated in the same form.

Device Dependent Acoustic Model Tree Generation Method

A device dependent acoustic model tree generates an acoustic model which is device independent by using pre-collected learning acoustic data and this acoustic model can be a root node to form a tree structure. The acoustic model tree and data tree having the same structure are formed together for which the pre-collected learning data is arranged in the root node and data corresponding to category of the device key is categorized as and stored to a sub-node from the root node.

The core point of the acoustic model tree of an embodiment of the present invention is categorization and sharing of data recorded in a user device through different channels. Data categorization is structured to share the data corresponding to the same device in the upper node and to be divided into detail device and personal data toward sub-nodes to extend to speaker dependent data. In addition, the data categorization allows explicit categorization by utilizing the pre-collected data and also automatic rule-based categorization according to the device key generation standard.

As shown in FIG. 4, a big group having different channels is established in an upper node on the basis of device names and further it is categorized on the basis of device detail names toward sub-nodes. The tree can be various steps according to a structuring method or various categories can be structured. An individual device node corresponding to random ID of the device key can be generated in a device node and collected data can be stored in the individual device node.

When acoustic data existing in each node of the generated tree is collected more than a predetermined reference value, an acoustic model of the corresponding node is generated with the collected data. On the other hand, when acoustic data is collected less than a predetermined reference value, the data tree gets expanded and larger but an acoustic model tree is structured to let only some of upper nodes including the root node generate learning models and sub-nodes be present without learning models.

Acoustic Model Tree Incremental Update Method

An acoustic model tree is generated and managed by using a data tree and a device key tree which have the same structure. An embodiment of the present invention is to improve speech recognition performance of individual users by continuously collecting data of online users and reflecting it to models. Thus, a method to increment data of each user is needed.

Reliabilities of voice data and recognized transcribed sentence are determined and then data of which reliability exceeds a threshold value is collected. Here, determination of the reliability can be performed using a likelihood ratio test being used for utterance verification.

User recognition data with the reliability that exceeds the threshold value is stored in a device node of the data tree by using the corresponding user device key and each device node and its sub-node can be used as data of the upper node connected therewith. Since data becomes smaller with the data tree categorization, the sub-node having small data uses this data as adaptation data and generates a sub-node acoustic model by using the upper acoustic model through model adaptation techniques such as MAP, MLLR and the like.

An acoustic model incremental update is an update through performing model adaptation using acoustic models of an upper node when amount of newly collected data of the user is more than a predetermined reference value. The acoustic model is updated from the device node to the upper node and when the sub-node acoustic model is adapted and the acoustic model of the upper node does not exist, the connected upper node where the acoustic model exists is searched and referenced.

The acoustic model tree updates by periodically checking the data collected in the device node and using acoustic model adaptation from the acoustic model of the sub-node. When data amount exceeds a recommended reference amount, re-learning process is processed toward upper nodes, and if not, it is updated by the acoustic model adaptation based on newly collected data.

Speech Recognition Model Selection

A model is selected from a device node of an acoustic model tree in order to select an acoustic model appropriate to a user but when the acoustic model does not exist in the device node, an acoustic model of an upper node connected thereto is selected. When a parallel recognizer is used, since a plurality of acoustic models are usable, either an acoustic model of the user device or an acoustic model of the upper node can be selected according to a predetermined rule.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. A speech recognition system using incremental device-based acoustic model adaptation comprising:
   a model selector configured to select an acoustic model of a multi-model tree by verifying and categorizing a device key transmitted from a user device;
   a model manager configured to generate and incrementally adapt the multi-model tree by categorizing voice data based on the device key; and
   a speech recognizer configured to perform speech recognition based on the selected acoustic model and transmit data of which reliability exceeds a predetermined threshold value to the model manager,
   wherein the device key represents channel features of the user device, and
   wherein the model manager comprises:
   a device-based multi-model tree generating part configured to categorize the voice data based on the device key, extract features therefrom and form the multi-model tree, the multi-model tree being categorized by the device key and comprising hierarchical acoustic models, incremental data and device key trees;
   a data incrementing part configured to receive data of which the reliability exceeds the predetermined threshold value from the speech recognizer, increment phonetic information and data to the multi-model tree, evaluate a degree of the incremented data of each node, and report a result of the evaluation to a model adaptation generating part when the degree exceeds a predetermined reference value; and the model adaptation generating part configured to incrementally adapt acoustic models corresponding to nodes where newly adapted data from the multi-model tree exceeds the predetermined reference value by using the phonetic information transmitted from the data incrementing part.

2. The speech recognition system of claim 1, wherein the model selector comprises:

a device key verification part configured to register the device key to a device key tree which is a component of the multi-model tree when the device key is a new device key, or receive an available acoustic model list of the device key tree from the multi-model tree when the device key is not a new device key; and a model selecting part configured to select one acoustic model or multi acoustic models to be used for parallel recognition from the available acoustic model list, and transmit address and information of the device key of the selection to the speech recognizer.

3. The speech recognition system of claim 2, wherein the available acoustic model list comprises, in a sequential order, a device independent model, a device dependent model, a detail device dependent model and a random ID dependent model included in the multi-model tree.

4. The speech recognition system of claim 2, wherein the model selecting part searches and selects acoustic models from a device node of an acoustic model tree which is a component of the multi-model tree using the device key, and selects acoustic models from an upper node connected to the device node if no acoustic model is present in the device node.

5. The speech recognition system of claim 4, wherein the model selecting part selects multi acoustic models from acoustic models of the user device corresponding to the device key and acoustic models of the upper node according to a predetermined rule when performing parallel recognition.

6. The speech recognition system of claim 1, wherein the device-based multi-model tree generating part categorizes the voice data by the device key and generates the multi-model tree which generates a device dependent model adapted at a device independent model.

7. The speech recognition system of claim 1, wherein, when a new device key is transferred from the model selector, the multi-model tree registers the new device key to the device key tree and generates a data node to collect data.

8. The speech recognition system of claim 1, wherein the data incrementing part searches at least one of the each node registered in the multi-model tree by using the device key received from the speech recognizer and increments data to the searched node and an upper node.

9. The speech recognition system of claim 1, wherein the speech recognizer comprises:

a pre-processing part configured to pre-process speech signals inputted from the user device;

a recognition part configured to perform speech recognition using feature-extracted data provided from the pre-processing part and the acoustic model selected by the model selector; and a reliability determining part configured to determine reliability of a result of speech recognition from the recognition part, output a result with the highest reliability as a recognition result, and transmit phonetic information, data and the device key to the model manager when the reliability exceeds a threshold value.

10. The speech recognition system of claim 9, wherein the recognition part receives a plurality of acoustic models from the model selector and performs parallel speech recognition for the plurality of acoustic models.

11. The speech recognition system of claim 1, wherein a speech recognition program is installed in the user device and the speech recognition program comprises:

a device key transferring part configured to generate the device key with initial installation of the speech recognition program and transmit the device key to the model selector, and transmit the device key to the model selector whenever the speech recognition program is used; and a speech recording part configured to record voice data inputted when speech recognition is performed and transmit the recorded voice data or feature-extracted data to the speech recognizer.

12. The speech recognition system of claim 1, wherein the device key comprises a device name, a device detail name and a random ID.

13. The speech recognition system of claim 1, wherein the multi-model tree comprises:

a data tree in which the entire data is categorized based on the device key;

an acoustic model tree in which an acoustic model of each node is generated by using the data in a node of the data tree as an adaption data; and a device key tree in which the device key is registered.

14. The speech recognition system of claim 1, wherein the multi-model tree comprises a node shared by user devices having similar channel features with each other.

15. A speech recognition method using incremental device-based acoustic model adaptation, the method comprising:

registering, to a device key tree, a device key transferred from a user device when a speech recognition program is installed;

selecting an available acoustic model by using the device key when the device key is transferred from the user device with execution of the speech recognition program;

performing speech recognition using the available acoustic model and voice data transferred from the user device;

incrementing data, of which reliability exceeds a threshold value when reliability of the speech recognition result is determined, with recognition information to a device node and an immediate upper node of multi-model tree according to the device key; and performing acoustic model incremental adaptation when data of each node of the multi-model tree exceeds a predetermined reference value;

categorizing the voice data based on the device key, extracting features therefrom and forming the multi-model tree, the multi-model tree being categorized by the device key and comprising hierarchical acoustic models, incremental data and device key trees;

incrementing phonetic information and data to the multi-model tree, evaluating a degree of the incremented data of each node, and reporting a result of the evaluation when the degree exceeds a reference value; and incrementally adapting acoustic models corresponding to nodes where newly adapted data from the multi-model tree exceeds the reference value by using the phonetic information;

wherein the device key represents channel features of the user device.

16. The speech recognition method of claim 15, wherein the multi-model tree comprises a node shared by user devices having similar channel features with each other.

* * * * *